Dec. 3, 1940.  H. W. STERLING  2,223,972
METHOD AND APPARATUS FOR FREEZING COMESTIBLES
Filed Feb. 11, 1939  2 Sheets-Sheet 1
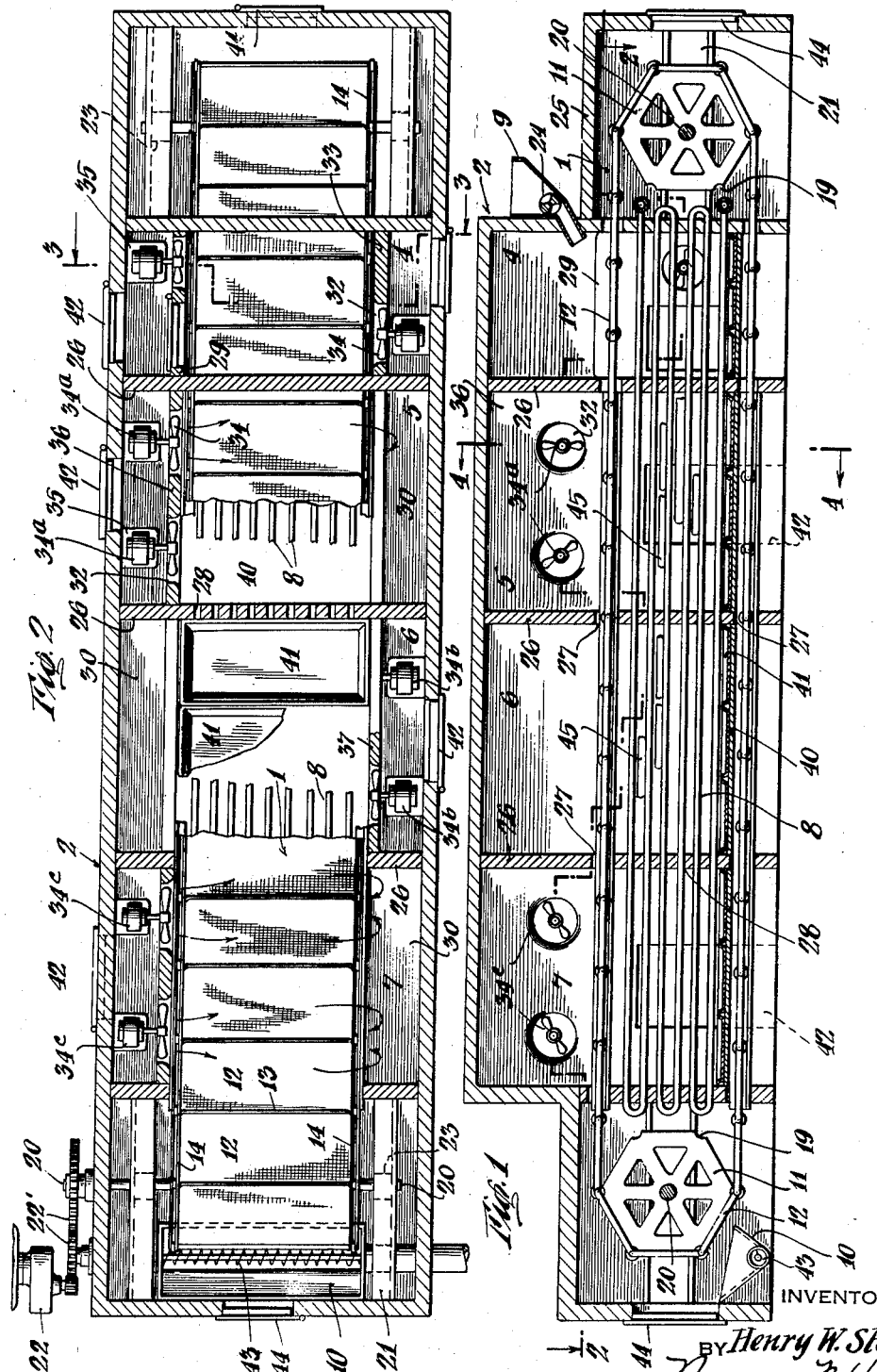
INVENTOR
Henry W. Sterling
BY
ATTORNEY

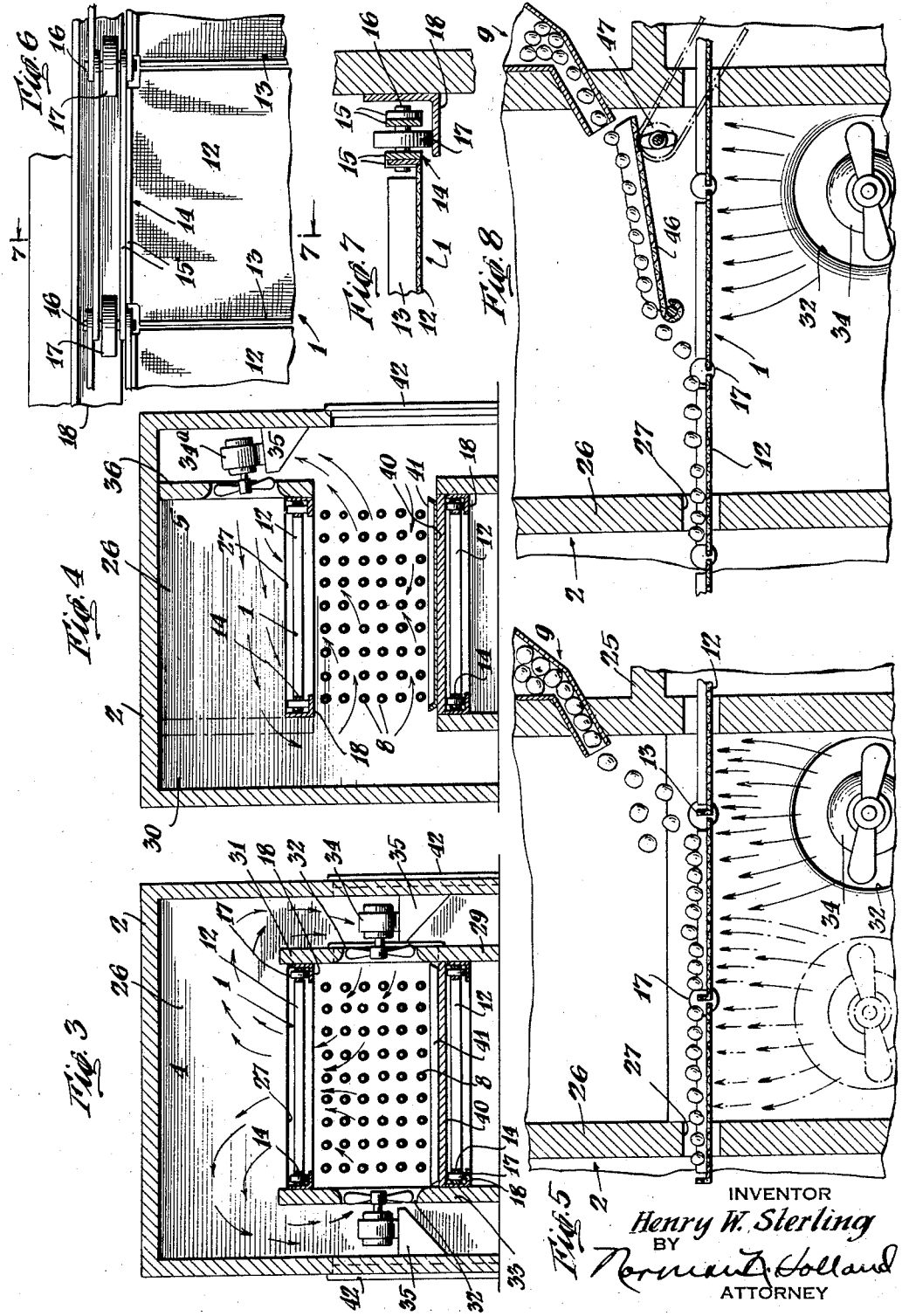

Patented Dec. 3, 1940

2,223,972

UNITED STATES PATENT OFFICE 2,223,972

METHOD AND APPARATUS FOR FREEZING COMESTIBLES

Henry W. Sterling, Salisbury, Md.

Application February 11, 1939, Serial No. 255,837

14 Claims. (Cl. 62—102)

The present invention relates generally to refrigeration and more particularly to a method and apparatus used for rapid freezing of comestibles such as fruits and vegetables, especially peas, corn, lima beans, cut stringless beans and the like, preparatory to packaging for storage and later consumption.

Such frozen comestibles are usually called quick frozen foods and are generally washed and in some cases blanched in hot water to remove and kill germs before being frozen. The commodities thus carry a maximum of surface moisture due to the previous washing or processing. When such articles are placed in a package for freezing, they adhere to each other and form a solid mass. It is particularly desirable that the consumer be able to handle the comestible as though it were not frozen and be able to use part of the package without having to divide a frozen mass. If the comestibles are placed on a pan or conveyor and subjected to sub-freezing temperatures, they adhere to each other and to the pan and conveyor. In such cases neither free removal of the comestible from the conveyor nor free handling of the product after packaging is feasible. The conveyor or pans are quickly fouled and the resulting product frozen en masse is unsatisfactory because it cannot be readily packed in, or removed from, packages in desired quantities.

The present invention aims to overcome the above difficulties by providing a method and apparatus for quick freezing comestibles in which adherence to each other and to the pan or conveyor used during freezing will be greatly minimized or completely eliminated. The packaging of the material is simplified and its convenient use by the consumer is facilitated. The invention further aims to freeze comestibles in a continuous process at a rapid rate without requiring shut-downs due to fouling of the parts, defrosting requirements and the like.

An object of the present invention is to provide an improved method and apparatus for quick freezing fruits and vegetables.

Another object of the invention is to provide a method and apparatus for quick freezing in which adherence of the material during freezing will be minimized or eliminated.

Another object of the invention is to prevent adherence of the material to a pan or conveyor.

Another object of the invention is to increase the speed of freezing comestibles.

Another object of the invention is to reduce the labor required in freezing comestibles.

Another object of the invention is to provide an improved continuous conveyor for use in an apparatus for quick freezing.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a longitudinal sectional view, illustrating a preferred embodiment of the invention;

Fig. 2 is a horizontal sectional view taken along the line 2—2 of Fig. 1;

Fig. 3 is a transverse sectional view through the first compartment taken along the line 3—3 of Fig. 2;

Fig. 4 is a sectional view extending transversely of the second compartment and taken along the line 4—4 in Fig. 1;

Fig. 5 is a fragmentary sectional view partly diagrammatic illustrating the delivery of a comestible, for example, peas, to the first compartment of the apparatus;

Fig. 6 is a fragmentary plan view of a portion of the conveyor;

Fig. 7 is a fragmentary sectional view on the line 7—7 of Fig. 6 illustrating details of the conveyor; and Fig. 8 is a fragmentary sectional view of a modified embodiment of the invention.

Described generally the preferred embodiment of the invention comprises a continuous conveyor 1 mounted in a heat insulating housing 2 which is divided into a series of compartments 4, 5, 6 and 7 through which the conveyor carries the comestible to be frozen. A series of cooling coils 8 serves for the refrigerating means. A feeding mechanism 9 at one end delivers the comestibles to the conveyor and a receptacle or a conveyor 10 at the other end receives the comestibles after they are frozen. The improvement resides more particularly in the construction of the conveyor and in the method and means for freezing the comestibles whereby greater speed is attained, adherence of the comestibles to the conveyor and to each other is minimized or eliminated and the fouling of the parts and impairment of the operation is reduced to a minimum. Other features and advantages will appear in the following more detailed description.

Referring again to the drawings, and more particularly to Figs. 1 and 2 thereof, there is shown a continuous conveyor 1 extending longitudinally of the housing 2 and mounted at its respective ends on hexagonal sprockets 11 with an upper load bearing strand moving in one direction and a lower idle strand moving in the opposite direction between said sprockets. Preferably the conveyor comprises a series of pans 12 having perforated bottoms which may be formed from mesh wire or other suitable means. The pans preferably have, at the front and sides thereof, upstanding portions 13 which serve to retain the comestibles on the pans. A pair of conveyor chains 14 are provided for supporting and conveying the pans 12 and comprise a series of links 15 (Fig. 7) secured at their ends by pins 16 on which are mounted rollers 17. The rollers of each chain move on the horizontal sides of angle irons 18 mounted on the respective sides of the compartments. The pins 16 extend through the ends of the upstanding side portions of the pans so that the sides of the pans, in effect, form a part of the link mechanism of the conveyor chain. The sprockets 11 have recesses 19 at the corners thereof adapted to receive the rollers 17 so that the pans with the rigid frames and likewise the conveyor chain with its rigid links will pass around the hexagonal sprockets. The pans and links are, in effect, hinged at their ends with the hinges engaging the sprockets at their corners as shown more particularly in Fig. 1. Upstanding sides 13 at the front edges of the pans 12 assist in spacing and moving comestibles along with the conveyor belt and also act to guide them into the receptacle 10. The sprockets 11 are mounted on the shafts 20 carried by bearings 23 adjustably fixed in the guideways 21 to take up slack in the conveyor. Any suitable drive may be utilized, for example, a motor 22 operatively connected through reducing gears 22' to one of the sprocket shafts 20 (Fig. 2).

While the broad aspects of the invention are not limited to the conveyor construction described, the latter has distinct advantages in that the sections or pans of the conveyor have inherent rigidity both longitudinally and transversally to prevent misalinement, stretching or excessive wear in operation which is common to known conveyor constructions. In addition, the construction affords a conveyor of greater carrying capacity than known types as the rigid characteristics thereof permit the use of conveyors of a width greatly in excess of that practical with conventional endless belts.

A bank of cooling or refrigerating coils 8 is mounted intermediate the upper and lower strands of the conveyor and extends longitudinally through the compartments 4, 5, 6 and 7 of the housing 2 and substantially throughout the length and width of the conveyor.

The housing 2 completely encloses the conveyor and the bank of refrigerating coils and has relatively thick walls of insulating material. The height of the housing 2, which completely encloses the conveyor and the bank of refrigerating coils, is preferably lower at the respective ends thereof adjacent the sprockets 11. Circulation of air at these points is not essential and additional height would increase the cost without corresponding advantages. In addition, the reduction in height at the feed end facilitates the mounting of the feeding mechanism 9 which may have a driven feed member 24 therein for automatically feeding the comestibles to the conveyor. If desired, the comestibles may be fed by hand. In either event, the end serves as a platform for a workman to deliver the comestibles to the hopper 9 or to feed them by hand to the conveyor. The portion of the housing intermediate the ends 25 is of greater height as described above, and is divided into compartments 4, 5, 6 and 7 by partitions 26. The partitions have openings 27 through which the upper and lower strands of the conveyor pass and also have openings or apertures 28 through which the cooling coils 8 extend and by which they are supported in spaced relation.

The width of the housing 2 is substantially greater than the width of the conveyor 1 to provide spaces 30 for the passage of air on the respective sides thereof. Each compartment has longitudinally extending partitions and fans so constructed and located as to cooperate in obtaining the refrigerating results desired. The operation in the first compartment 4 where the comestibles are delivered is important. Referring to Figs. 1, 2, 3 and 4 and more particularly Figs. 3 and 4, there are longitudinal partitions 29 and 33 on the respective sides of the conveyor which extend upwardly slightly above the conveyor and support the angle irons 18 on which the conveyor moves. Apertures 32 are formed in each of the partitions and motor driven fans 34 are mounted in the apertures and supported on brackets 35 secured to the housing 2 to force air through the refrigerating coils and upwardly through the conveyor 1. Referring more particularly to Fig. 5, it will be noted that the force of the air coming from the fans and passing upwardly through the conveyor tends to cause the comestibles being delivered to the conveyor in this compartment substantially to float or remain in suspension a slight distance above the conveyor. The fan at the near side of the apparatus is shown in dot-dash lines in Fig. 5 in order to illustrate the action of both fans on the comestibles. The speed and size of the fans may be such as to give the proper volume and current of air to obtain the best results. While it may not be necessary, however, in all cases to raise the comestible off the conveyor, it is desirable that the comestible be agitated to such an extent by the current of air in this first compartment that freezing of the outer surface of the comestible, and particularly the freezing of any moisture or liquid thereon, is accomplished without the comestible becoming frozen to the conveyor. The velocity of the air currents and the speed of the conveyor may be regulated to obtain this result. As shown herein, the fans face each other in this compartment and force the air directly upwardly against the comestibles falling on the conveyor. It has been found that various vegetables such as lima beans, stringless beans, peas and the like may be frozen on the continuously moving conveyor without adherence thereto. This is particularly important since the comestible cannot be readily removed from the conveyor if it is frozen to it and in addition a certain amount of ice will otherwise be left on the conveyor which tends to foul the conveyor and to prevent passage of refrigerated air therethrough.

A removable partition 36 is mounted at one side of the conveyor in compartment 5 and extends from the upper strand of the conveyor to the top of the compartment. Motor driven fans 34a are mounted therein and preferably direct the air over the conveyor and in a slightly downward direction so that the air passes over and through the conveyor intermediate the refrigerating coils as shown in Fig. 4. The outer surface of the comestibles has already been frozen and will not adhere to the conveyor. The refrigerated air is to maintain a low temperature and to freeze the inside of the comestibles.

The direction of the air in compartment 6 is reversed as shown more particularly in Fig. 2, the fans 34b being mounted below the upper stand of the conveyor belt to blow refrigerated air through the apertures of the partition 37 and upwardly through the conveyor belt. Essentially, compartment 6 is similar to compartment 4 shown in Fig. 3 except that the partition and fans are preferably on one side of the conveyor only.

Compartment 7 is similar to compartment 5, and a description of it is not necessary. The motor driven fans 34c are mounted in the same position as fans 34a.

After the comestibles have moved through the four compartments on the conveyor, they are completely frozen to a very low temperature and are ready to be removed from the conveyor. As the conveyor passes over the sprocket at the delivery end, the comestibles drop into the receptacle 10 which may be a conveyor or a suitable receptacle having mechanical means such as a feed screw or a conveyor 43 for removing the comestibles therefrom. If desired, a suitable rotating brush may be mounted to be effective upon the conveyor to remove any of the comestibles which might, by some chance, have adhered to the conveyor.

Preferably a floor or partition 40 extends beneath the bank of refrigerating coils directly above the lower strand of the conveyor to prevent any particles of ice which fall from the refrigerating coils from fouling the conveyor. If desired, suitable pans 41 may be mounted on the floor so that the ice and frost dropping from the coils may be readily removed. Suitable doors 42 are provided in each of the compartments to facilitate removal of the trays and to give access to the coils for defrosting and for other purposes. Suitable doors 44 may be provided at the ends of the housing to afford access thereto. An additional advantage of the compartments 4, 5, 6 and 7 is that the mechanism may be cleaned or defrosted, one compartment at a time, without shutting down the freezer. Heretofore, it has been customary to shut down the machine for several hours when it is necessary to defrost it or to clean it. By means of the doors 42 and the separate compartments, it is possible to clean any compartment without stopping the machine. A further advantage of the invention is that the mechanism may be used for freezing packages or pans of comestibles by inserting them on the coils 8 as shown at 45. Such packages may be frozen without stopping the regular freezing of comestibles on the conveyor. Certain types of products may be frozen after they are packed in packages and such packages may be placed on the coils 8 for that purpose.

A modified embodiment of compartment 4, in which the comestibles are fed to the conveyor, is shown in Fig. 8. In this construction the comestibles are delivered to a pan 46 somewhat similar to the pans of the conveyor and a suitable mechanism, illustrated diagrammatically at 47, is utilized to shake or vibrate the pan so that the comestibles are continuously agitated and formed into a substantially uniform layer thereon during their slow movement down the pan onto the conveyor belt. In addition, air is forced upwardly through the conveyor belt by the fans 34 and is equally effective on the comestibles in the pan 46 which further tends to prevent any adherence of the comestibles while the outer surface is being frozen. If desired, the upstanding side at the front end of the pans may be omitted, as shown more particularly in Fig. 8, so that there will be no obstruction to the comestibles sliding out as the pans pass over the sprocket at the delivery end of the conveyor. The mechanism, illustrated in Fig. 8, is preferable added to that shown in Fig. 5 for certain types of comestibles, but may, if desired, be used with any type of conveyor and with any type of circulation with advantages.

In the operation of the device, the comestibles are fed either by hand or by a hopper at 9 and are delivered by slow gradual feeding to the conveyor 1 in compartment 4. The fans 34 in compartment 4, as shown more particularly in Fig. 3, force the air upwardly through the conveyor belt tending to cause the comestibles substantially to float on or slightly above the conveyor belt thereby decreasing any tendency of the comestible to adhere to the conveyor and also decreasing any tendency of ice forming on the conveyor and fouling it. The outer surfaces of the comestibles are frozen in compartment 4 without material adherence of the comestibles together or to the conveyor. Thereafter, the comestibles pass into compartments 5, 6 and 7 where further refrigeration is applied for freezing the interior of the comestibles. As the conveyor passes over the sprocket at the delivery end, the comestibles drop into a receptacle 10 which may be removed by hand or the comestibles may be removed therefrom automatically by a conveyor or similar means if desired. Suitable packages 45 may be inserted on the refrigerating coils, access to which may be obtained through doors 42. Packages, placed on the coils, can be frozen simultaneously with comestibles on the conveyor. The freezer may be defrosted or cleaned one compartment at a time without shutting it down.

It will be seen that the present invention provides an improved method and apparatus for the quick freezing of comestibles. The operation is continuous. The comestibles are prevented from freezing en masse and are prevented from adhering to or fouling the conveyor. The several compartments in the freezer permit the amount of refrigeration in each compartment to be regulated so that the comestibles are completely frozen to the extent desired when they leave the last compartment. In addition, separate compartments with doors providing access thereto permit the freezer to be defrosted and cleaned one compartment at a time without shutting it down. An improved conveyor permits maximum width without sagging and tends to facilitate the refrigerating process.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of freezing comestibles and the like, which method comprises, causing the comestibles which are to be frozen to move in a downwardly direction and directing a gaseous cooling medium upwardly against the downwardly moving comestibles with sufficient force substantially to negative the force of gravity thereon, whereby the outer surface thereof is frozen prior to the comestibles reaching a support.

2. The method of freezing comestibles and the like having moisture or liquid on the outer surface thereof which method comprises dropping the comestibles into a freezing atmosphere and directing a stream of the freezing atmosphere upwardly against the downwardly moving comestibles to reduce the speed thereof and to freeze the moisture or liquid on the outer surfaces thereof, prior to their reaching and being supported on a support, to prevent adherence of the comestibles to the support.

3. The method of freezing comestibles and the like which method comprises delivering the comestibles into a freezing atmosphere, directing a stream of refrigerated air upwardly through the comestibles, while they are falling in the freezing atmosphere, to reduce the speed thereof and to freeze the outer surfaces thereof prior to their reaching a support to prevent adherence of the comestibles to the support.

4. The method of freezing comestibles and the like which method comprises delivering the comestibles to a support, and directing a gaseous cooling medium upwardly through the support with sufficient force to prevent adherence of the comestibles to the support during the freezing of the outer surfaces thereof.

5. The method of freezing comestibles and the like which method comprises delivering comestibles having a wet surface to a support, and directing a gaseous cooling medium upwardly through the support with sufficient force to prevent adherence of the comestibles to the support during the freezing of the wet surface thereof.

6. The method of freezing comestibles and the like which method comprises directing the comestibles toward a support, and forcing a low temperature gaseous cooling medium upwardly through the support with sufficient force substantially to cause the comestible to float above the support during the freezing of the outer surface thereof.

7. The method of freezing comestibles, and the like, which method comprises, agitating the comestibles by movement of the support therefor, and directing a gaseous refrigerating medium at a substantial velocity through said comestibles to further agitate them and to freeze the outer surface thereof to prevent adherence of the comestibles to each other and to a support.

8. The method of freezing comestibles, and the like, which method comprises agitating the comestibles and during the agitation forcing a gaseous cooling medium upwardly against the comestibles to cause the comestibles to be suspended in the cooling medium at least intermittently until the outer surface thereof is frozen to prevent adherence thereof to other objects, and thereafter freezing the interior of the comestibles while resting on a support.

9. The method of freezing comestibles, and the like, which method comprises agitating the comestibles and during the agitation forcing a gaseous cooling medium upwardly against the comestibles to cause the comestibles to be suspended in the cooling medium at least intermittently until the outer surface thereof is frozen to prevent adherence thereof to other objects, discontinuing the agitation and thereafter freezing the interior of the comestibles.

10. In a device of the class described, the combination of a continuous conveyor for carrying a comestible through a cooling medium, an agitator above the conveyor for delivering the comestible to the conveyor, and means for forcing a gaseous cooling medium upwardly through the conveyor and through the agitator to prevent the comestible from adhering to the conveyor or to the agitator during the freezing of the outer surface thereof.

11. In a device of the class described, the combination of sprockets, a continuous conveyor in the form of a series of connected foraminous pans mounted on said sprockets and adapted to move continuously for carrying comestibles through a cooling medium, and an agitator in the cooling medium above the conveyor adapted to agitate the comestibles prior to their delivery to the continuous conveyor and during the freezing of the outer surfaces thereof to prevent adherence of the comestibles to other objects during the freezing of the comestibles.

12. In a device of the class described, the combination of a continuous conveyor having an upper and lower strand, sprockets for supporting the ends of the conveyor, means forming a series of compartments longitudinally of the conveyor for enclosing the conveyor, cooling coils intermediate the strands of the conveyor, means under said coils and above the lower strand of the conveyor for receiving and holding ice and snow removed from the coils, and doors leading to said compartments.

13. In a device of the class described, the combination of an endless conveyor having an upper and lower strand, said conveyor being formed of a series of hinged pans with perforated bottoms, polygonally shaped sprockets at the ends of the conveyor for supporting and driving the same, the corners of said sprockets engaging the conveyor at the hinged portions thereof, cooling coils intermediate the strands of the conveyor, means forming a series of compartments longitudinally of the conveyor, means in the first compartment for forcing a gaseous cooling medium upwardly through the perforations in the conveyor to freeze the outer surface of comestibles on said conveyor without adherence thereof to the conveyor, means for circulating the gaseous cooling medium in the other compartments, means disposed beneath the cooling coils and above the lower strand of the conveyor for holding frost and ice removed from the coils, doors to said compartments, and means for delivering a comestible to the conveyor in the first compartment.

14. The method of freezing comestibles and the like, which method comprises dropping the comestibles toward a lower support, interrupting the fall of the comestibles by an intermediate support, agitating the comestibles by movement of the intermediate support and directing a gaseous refrigerating medium through said comestibles to further agitate them and to freeze the outer surface thereof to prevent adherence of the comestibles to each other and to the supports.

HENRY W. STERLING.